Patented July 13, 1943

2,323,940

UNITED STATES PATENT OFFICE 2,323,940

VULCANIZATION OF RUBBER

Arthur W. Sloan, Akron, Ohio, assignor to The B. F. Goodrich Company, New York, N. Y., a corporation of New York No Drawing. Application December 5, 1939, Serial No. 307,638

14 Claims. (Cl. 260—793)

This invention relates to the vulcanization of rubber and has as its principal object to provide a new and effective class of vulcanization accelerators.

I have discovered that thiocarbamyl aminomethyl sulfides having the general structural formula

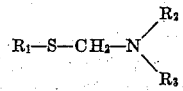

wherein $R_1$ is a thiocarbamyl group, $R_2$ is a member of the class consisting of hydrogen and aliphatic radicals, and $R_3$ is a member of the class consisting of hydrogen, aliphatic, and aromatic radicals are excellent accelerators of vulcanization.

$R_1$ may be the dimethylthiocarbamyl, diethylthiocarbamyl, ethylbenzylthiocarbamyl, dibenzylthiocarbamyl, di-cyclohexylthiocarbamyl, methyl-phenyl-thiocarbamyl, diphenylthiocarbamyl, phenyl-beta-naphthyl-thiocarbamyl, di-beta-naphthylthiocarbamyl, dixenylthiocarbamyl, di-o-, m-, or p-tolylthiocarbamyl, dianthrylthiocarbamyl, phenylthiocarbamyl group, or the like, diarylthiocarbamyl groups being preferred.

$R_2$, when it is not hydrogen, may be a methyl, ethyl, isopropyl, allyl, vinyl, cyclohexyl, benzyl, methoxymethyl, hydroxyethyl, aminoethyl, chlormethyl, or other alkyl, cycloalkyl, aralkyl, hydroxyalkyl, alkoxyalkyl, haloalkyl, or aminoalkyl group, while $R_3$ may be any of these groups or aromatic groups such as phenyl, tolyl, naphthyl, cumyl, cymyl, anthryl, phenanthryl, xenyl, anisyl, anilinophenyl, or similar groups. The compounds in which $R_2$ and $R_3$ are hydrogen or hydrocarbon groups are preferred.

Specific compounds within the class herein defined include

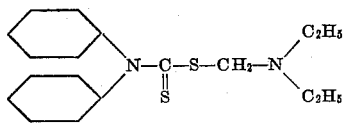

diphenylthiocarbamyl diethylaminomethyl sulfide, diphenylthiocarbamyl anilinomethyl sulfide, phenyl-beta-naphthyl-thiocarbamyl cyclohexylaminomethyl sulfide, and di-beta-naphthylthiocarbamyl aminomethyl sulfide.

As a specific example of the method of this invention, the following compositions were prepared:

| | Composition | |
|---|---|---|
| | I | II |
| Rubber | 100 | 100 |
| Zinc oxide | 5 | 5 |
| Stearic acid | 1 | 1 |
| Sulfur | 3 | 3 |
| Diphenylthiocarbamyl diethylaminomethyl sulfide | 0.5 | 0 |
| Diphenylthiocarbamyl anilinomethyl sulfide | 0 | 0.5 |

When these compositions were cured for varying times at different temperatures, vulcanizates having the following properties were obtained, T representing tensile strength at break in lbs./in.$^2$ and E representing ultimate elongation in per cent:

| Composition | Time of cure | Temp. of cure | T | E |
|---|---|---|---|---|
| | Minutes | °F. | | |
| I | 60 | 220 | 2,400 | 900 |
| I | 15 | 287 | 3,845 | 780 |
| II | 60 | 220 | 2,340 | 900 |
| II | 15 | 287 | 3,165 | 810 |

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize generally those rubbery materials which are capable of vulcanization with sulfur, including caoutchouc, balata, gutta percha, synthetic rubber, or natural or artificially prepared latex, all of which are herein designated by the generic term "a rubber"; that the accelerators may be incorporated in the rubber by mastication or milling, or in the case of latex or other dispersion or solution, by simply dissolving or suspending the accelerator therein; that the accelerators may be used in admixture with each other or with other known accelerators or with antioxidants, organic acids, amines, softeners, activators, retarders, pigments, fillers, etc.; and that the rubber may be vulcanized with the assistance of this new class of accelerators in heated molds, hot air, steam, hot water, etc. The accelerators of this invention may advantageously be used in as low a proportion as 0.05% of the rubber in the composition, in which case 3 to 5% of sulfur is generally required, or as high as 5%, with a much reduced quantity of sulfur.

This invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

I claim:

1. The method which comprises vulcanizing a rubber in the presence of a compound having the general structural formula

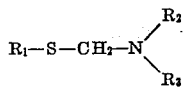

wherein $R_1$ is a thiocarbamyl group, and

is a hydrocarbon substituted amino group in which not more than one of the hydrocarbon substituents is aromatic.

2. The method which comprises vulcanizing a rubber in the presence of a compound having the general structural formula

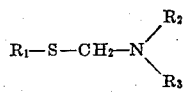

wherein $R_1$ is a diarylthiocarbamyl group, $R_2$ is an aliphatic hydrocarbon group, and $R_3$ is a hydrocarbon group.

3. The method which comprises vulcanizing a rubber in the presence of a thiocarbamyl dialkylaminomethyl sulfide.

4. The method which comprises vulcanizing a rubber in the presence of a diarylthiocarbamyl dialkylaminomethyl sulfide.

5. The method which comprises vulcanizing a rubber in the presence of diphenylthiocarbamyl diethylaminomethyl sulfide.

6. The method which comprises vulcanizing a rubber in the presence of a thiocarbamyl anilinomethyl sulfide.

7. The method which comprises vulcanizing a rubber in the presence of diphenylthiocarbamyl anilinomethyl sulfide.

8. An unvulcanized but vulcanizable composition comprising a rubber, a vulcanizing agent, and a compound having the general structural formula

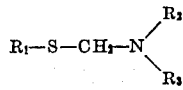

wherein $R_1$ is a thiocarbamyl group, and

is a hydrocarbon substituted amino group in which not more than one of the hydrocarbon substituents is aromatic.

9. An unvulcanized but vulcanizable composition comprising a rubber, a vulcanizing agent, and a compound having the general structural formula

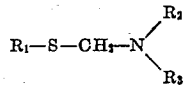

wherein $R_1$ is a diarylthiocarbamyl group, $R_2$ is an aliphatic hydrocarbon radical, and $R_3$ is a hydrocarbon radical.

10. An unvulcanized but vulcanizable composition comprising a rubber, a vulcanizing agent, and a thiocarbamyl dialkylaminomethyl sulfide.

11. An unvulcanized but vulcanizable composition comprising a rubber, a vulcanizing agent, and diarylthiocarbamyl dialkylaminoethyl sulfide.

12. An unvulcanized but vulcanizable rubber composition comprising a rubber, a vulcanizing agent, and diphenylthiocarbamyl diethylaminomethyl sulfide.

13. An unvulcanized but vulcanizable composition comprising a rubber, a vulcanizing agent, and a thiocarbamyl anilinomethyl sulfide.

14. An unvulcanized but vulcanizable composition comprising a rubber, a vulcanizing agent, and diphenylthiocarbamyl anilinomethyl sulfide.

ARTHUR W. SLOAN.

CERTIFICATE OF CORRECTION.

Patent No. 2,323,940.

July 13, 1943.

ARTHUR W. SLOAN.

It is hereby certified that error appears in the printed specification of the above numbered patent requiring correction as follows: Page 2, second column, line 40, claim 11, for "dialkylaminoethyl" read --dialkylaminomethyl--; line 42, claim 12, after "vulcanizable" strike out --rubber--; and that the said Letters Patent should be read with this correction therein that the same may conform to the record of the case in the Patent Office.

Signed and sealed this 21st day of September, A. D. 1943.

Henry Van Arsdale,
Acting Commissioner of Patents.

(Seal)